US011436123B2

(12) United States Patent
Kleiner et al.

(10) Patent No.: US 11,436,123 B2
(45) Date of Patent: Sep. 6, 2022

(54) APPLICATION EXECUTION PATH TRACING FOR INLINE PERFORMANCE ANALYSIS (71) Applicant: EMC IP Holding Company LLC, Hopkinton, MA (US)

(72) Inventors: Vladimir Kleiner, Yahud (IL); Vladimir Shveidel, Pardes-Hana (IL); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/916,219

(22) Filed: Jun. 30, 2020

(65) Prior Publication Data
US 2021/0406149 A1 Dec. 30, 2021

(51) Int. Cl.
*G06F 11/34* (2006.01)
*G06F 11/30* (2006.01)

(52) U.S. Cl.
CPC ........ *G06F 11/3495* (2013.01); *G06F 11/302* (2013.01)

(58) Field of Classification Search
CPC ............... G06F 11/302; G06F 11/3419; G06F 11/3466; G06F 11/3495; G06F 2201/865; G06F 2201/88
USPC ......................................................... 702/186
See application file for complete search history.

(56) References Cited

U.S. PATENT DOCUMENTS

| 6,735,758 | B1 * | 5/2004 | Berry .................. G06F 11/3466 717/130 |
| 7,908,436 | B1 | 3/2011 | Srinivasan |
| 8,423,733 | B1 | 4/2013 | Ozdemir et al. |
| 8,954,383 | B1 | 2/2015 | Vempati et al. |
| 9,003,227 | B1 | 4/2015 | Patel et al. |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — John H Le
(74) *Attorney, Agent, or Firm* — Ryan, Mason & Lewis, LLP (57) ABSTRACT

Techniques are provided for application tracing for inline performance analysis. One method comprises obtaining trace events generated by instructions executed in response to trace points in instrumented software; updating, for each trace event, a buffer entry of a sampling buffer that corresponds to a particular processing core and a time window, wherein the buffer entry is identified based on (a) a flow type identifier associated with the instructions, (b) an identifier of a respective trace event, and (c) an identifier of an adjacent trace event to the respective trace event, and wherein the updating comprises updating, for the time window: (i) a first counter indicating a cumulative number of events for the respective and adjacent trace events, and (ii) a second counter indicating a cumulative amount of time between the respective and adjacent trace events; and determining one or more performance metrics associated with the respective and adjacent trace events in the time window using the first and second counters.

20 Claims, 7 Drawing Sheets

(56) References Cited

U.S. PATENT DOCUMENTS

| | | | |
|---|---|---|---|
| 9,104,675 B1 | 8/2015 | Clark et al. | |
| 9,390,116 B1 | 7/2016 | Li | |
| 9,569,306 B1 | 2/2017 | Camp et al. | |
| 9,569,357 B1 | 2/2017 | Shalev | |
| 9,778,996 B1 | 10/2017 | Bono et al. | |
| 9,836,243 B1 | 12/2017 | Chanler et al. | |
| 10,210,048 B2 | 2/2019 | Sancheti | |
| 10,474,367 B1 | 11/2019 | Mallick et al. | |
| 10,810,076 B1 | 10/2020 | Spiro et al. | |
| 11,061,770 B1 | 7/2021 | Patel et al. | |
| 11,068,199 B2 | 7/2021 | Shveidel et al. | |
| 2003/0135789 A1* | 7/2003 | DeWitt, Jr. | G06F 11/3636 |
| | | | 714/E11.212 |
| 2006/0212244 A1* | 9/2006 | Levine | G06F 11/3466 |
| | | | 702/79 |
| 2008/0155339 A1* | 6/2008 | Lowe | G06F 11/3636 |
| | | | 714/38.13 |
| 2010/0211616 A1 | 8/2010 | Khandelwal | |
| 2011/0307447 A1 | 12/2011 | Sabaa et al. | |
| 2014/0244935 A1 | 8/2014 | Ezra et al. | |
| 2014/0310499 A1 | 10/2014 | Sundararaman et al. | |
| 2015/0127618 A1 | 5/2015 | Alberti et al. | |
| 2015/0234706 A1 | 8/2015 | Rawat et al. | |
| 2015/0317326 A1 | 11/2015 | Bandarupalli et al. | |
| 2016/0070652 A1 | 3/2016 | Sundararaman et al. | |
| 2016/0077746 A1 | 3/2016 | Muth et al. | |
| 2016/0092677 A1 | 3/2016 | Patel et al. | |
| 2016/0110249 A1 | 4/2016 | Desai et al. | |
| 2017/0052717 A1 | 2/2017 | Rawat et al. | |
| 2017/0132083 A1 | 5/2017 | Desai et al. | |
| 2017/0315879 A1 | 5/2017 | Sundararaman et al. | |
| 2017/0277709 A1 | 9/2017 | Strauss et al. | |
| 2018/0285198 A1 | 10/2018 | Dantkale et al. | |
| 2018/0307609 A1 | 10/2018 | Qiang et al. | |
| 2018/0341513 A1 | 11/2018 | Davies | |
| 2019/0042134 A1 | 2/2019 | Nishizono | |
| 2019/0114217 A1 | 4/2019 | Sundararaman et al. | |
| 2020/0019620 A1 | 1/2020 | Sarda et al. | |
| 2020/0034308 A1 | 1/2020 | Shveidel et al. | |
| 2020/0065399 A1 | 2/2020 | Desai et al. | |
| 2020/0065408 A1 | 2/2020 | Desai et al. | |
| 2020/0133541 A1 | 4/2020 | Kleiner et al. | |
| 2020/0226035 A1 | 7/2020 | Li et al. | |
| 2020/0241793 A1 | 7/2020 | Shveidel et al. | |
| 2020/0311025 A1 | 10/2020 | Singh et al. | |

OTHER PUBLICATIONS

NVM Express, "NVM Express, Revision 1.3," NVM Express, May 1, 2017, 282 pages.

Commvault, "Storage Policy (Snapshot)" https://documentation.commvault.com/commvault/v11/article?p=60105_1.htm, Sep. 12, 2019, 3 pages.

Oracle, "Managing Snapshots," https://docs.cloud.oracle.com/en-us/iaas/Content/File/Tasks/managingsnapshots.htm, 2020, 3 pages.

U.S. Appl. No. 16/861,986 filed in the name of Vladimir Shveidel et al. on Apr. 29, 2020, and entitled "Lockless Metadata Binary Tree Access."

U.S. Appl. No. 16/862,733 filed in the name of Alexander S. Mathews et al. on Apr. 30, 2020, and entitled "Finding Storage Objects of a Snapshot Group Pointing to a Logical Page in a Logical Address Space of a Storage System."

U.S. Appl. No. 16/862,735 filed in the name of Dixitkumar Vishnubhai Patel et al. on Apr. 30, 2020, and entitled "Mapping Virtual Block Addresses to Portions of a Logical Address Space that Point to the Virtual Block Addresses."

U.S. Appl. No. 16/862,740 filed in the name of Rohit K. Chawla et al. on Apr. 30, 2020, and entitled "Generating Recommendations for Initiating Recovery of a Fault Domain Representing Logical Address Space of a Storage System."

U.S. Appl. No. 16/863,433 filed in the name of Sorin Faibish et al. on Apr. 30, 2020, and entitled "Cache Retention for Inline Deduplication Based on Number of Physical Blocks with Common Fingerprints Among Multiple Cache Entries."

U.S. Appl. No. 16/879,459 filed in the name of Yousheng Liu et al. on May 20, 2020, and entitled "Reusing Overwritten Portion of Write Buffer of a Storage System."

U.S. Appl. No. 16/888,668 filed in the name of Kundan Kumar et al. on May 30, 2020, and entitled "Selective Snapshot Creation Using Source Tagging of Input-Output Operations."

U.S. Appl. No. 16/897,388 filed in the name of Alex Soukhman et al. on Jun. 10, 2020, and entitled "Garbage Collection in a Storage System at Sub-Virtual Block Granularity Level."

U.S. Appl. No. 16/907,560 filed in the name of Vamsi K. Vankamamidi et al. on Jun. 22, 2020, and entitled "Regulating Storage Device Rebuild Rate in a Storage System."

U.S. Appl. No. 16/916,621 filed in the name of Dixitkumar Vishnubhai Patel et al. on Jun. 30, 2020, and entitled "Reconstruction of Logical Pages in a Storage System."

U.S. Appl. No. 16/916,763 filed in the name of Dixitkumar Vishnubhai Patel et al. on Jun. 30, 2020, and entitled "Reconstruction of Links between Logical Pages in a Storage System."

U.S. Appl. No. 16/917,090 filed in the name of Dixitkumar Vishnubhai Patel et al. on Jun. 30, 2020, and entitled "Reconstruction of Links to Orphaned Logical Pages in a Storage System."

U.S. Appl. No. 16/938,272 filed in the name of Xiangping Chen et al. on Jul. 24, 2020, and entitled "Efficient Token Management in a Storage System."

Tony Finch, "Incremental Calculation of Weighted Mean and Variance," University of Cambridge Computing Service (Feb. 2009).

United States Published Patent Application No. 2020/0133541, U.S. Appl. No. 16/176,351, filed Oct. 31, 2018, entitled "Method and Apparatus for Bottleneck Identification in High-Performance Storage Systems".

U.S. Appl. No. 16/260,660, filed Jan. 29, 2019 entitled, "System and Method for Aggregating Metadata Changes in a Storage System."

* cited by examiner

APPLICATION EXECUTION PATH TRACING FOR INLINE PERFORMANCE ANALYSIS

FIELD

The field relates generally to information processing techniques and more particularly, to the monitoring of software.

BACKGROUND

Execution path tracing (often referred to as "application tracing") is a mechanism for monitoring the operations and/or performance of instances of an executing application.

Performance analysis of storage systems, for example, may require a detailed breakdown of input/output (TO) processing flows. One approach to application tracing defines traced code fragments by "begin" and "end" points inserted in the source code during an instrumentation process. When the application executes, a timestamp and an execution instance identifier are collected each time a begin point and/or an end point are processed by the executed code. Existing application tracing techniques, however, can impair performance, require significant bandwidth and/or create recordings of prohibitive size.

A need exists for improved techniques for application tracing.

SUMMARY

In one embodiment, a method comprises obtaining a plurality of trace events generated by one or more instructions executed in response to trace points placed in instrumented software; updating, for each trace event, a buffer entry of a particular sampling buffer of a plurality of sampling buffers, wherein the particular sampling buffer corresponds to a particular processing core of a plurality of processing cores and a time window, wherein the particular processing core executes the one or more instructions that generated a respective trace event, wherein the buffer entry of the particular sampling buffer is identified based at least in part on (a) a flow type identifier associated with the one or more instructions, (b) an identifier of the respective trace event, and (c) an identifier of an adjacent trace event to the respective trace event, wherein the adjacent trace event corresponds to an adjacent trace point processed by a given execution instance, and wherein the updating comprises (i) updating a first counter indicating a cumulative number of events for the respective trace event and the adjacent trace event for the time window, and (ii) updating a second counter indicating a cumulative amount of time between the respective trace event and the adjacent trace event in the time window; and determining one or more performance metrics associated with the respective trace event and the adjacent trace event in the time window using the first counter and the second counter.

In some embodiments, a variance, a minimum and/or a maximum of the time between the respective trace event and the adjacent trace event in the time window are determined using the first counter and the second counter. In one or more embodiments, the flow type identifier is identified in the instrumented software and identifies a flow type comprising a read synchronous flow, a write synchronous flow, a disk defragmentation flow, a disk rebuild flow, a synchronous execution flow and/or a background execution flow.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for application tracing for inline performance analysis.

As noted above, application tracing techniques separately measure and collect traces for each individual execution instance. In this manner, each trace point (defined, for example, using begin or end points inserted in the source code) creates a trace event in the context of an execution instance that is typically streamed to memory and then written to disk (or other long-term storage). Such trace streaming may degrade performance, and one or more trace events may be randomly dropped under a high load. Therefore, existing application tracing techniques may not provide reliable statistics for performance analysis of highly loaded systems. In addition, existing application tracing techniques do not enable an inline analysis (the collected trace event recordings can be analyzed only offline).

One or more aspects of the disclosure recognize that postprocessing analytic tools for application tracing typically do not look at an individual execution instance but rather, on statistical characteristics of some subset of execution instances, such as running averages, variances, and minimum and/or maximum (tail) values of rates and latencies.

In one or more embodiments, improved techniques are provided for application tracing. In at least some embodiments, the disclosed application tracing techniques achieve significant scale optimization (in terms of execution instances) by using inline statistical preprocessing of the collected trace data. The size of the trace recordings over a time interval may be proportional to the number of flow types that appeared during the time interval, as discussed further below. In addition, in some embodiments, the smaller size of the generated data is substantially non-intrusive (for example, the penalty of the trace recording itself on the system performance is negligible or even zero).

Figure 1:
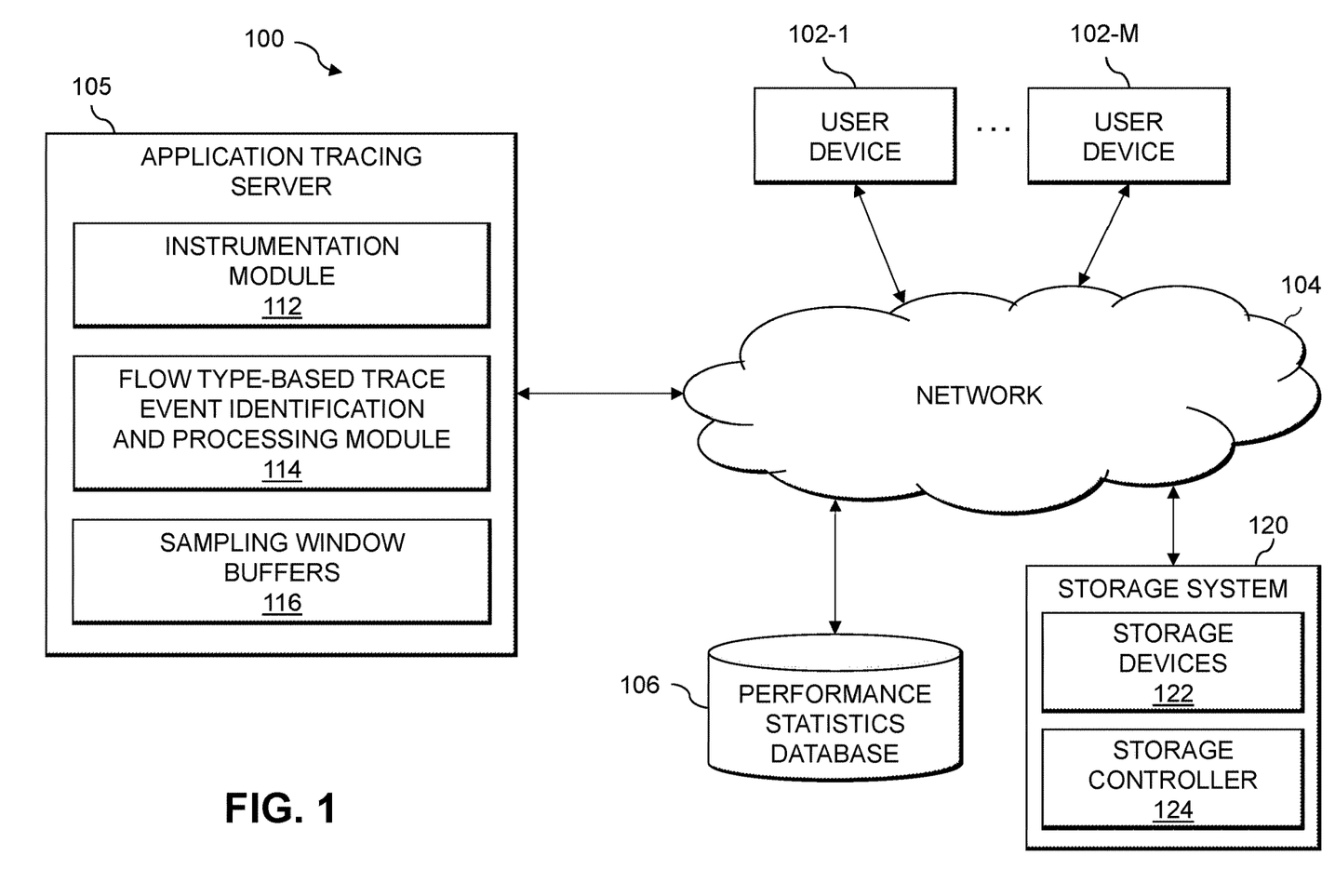
FIG. 1 illustrates a computer network configured for application tracing for inline performance analysis in accordance with an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is an application tracing server 105, a performance statistics database 106, and a storage system 120.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate IO operations that are processed by the storage system 120. The term "input-output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122 and an associated storage controller 124. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the user devices 102 (for example, when implemented as host devices) and the storage system 120 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the user devices 102 to communicate with the storage system 120 illustratively comprise SCSI or iSCSI commands, other embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the storage system 120. Such interaction illustratively includes generating IO operations, such as write and read requests, and sending such requests over the network 104 for processing by the storage system 120. In some embodiments, each of the user devices 102 comprises a multi-path input-output (MPIO) driver configured to control delivery of IO operations from the host device to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell EMC. Other types of MPIO drivers from other driver vendors may be used.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

It is assumed in some embodiments that the processing modules of a distributed implementation of storage controller 124 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

Each storage node of a distributed implementation of storage system 120 illustratively comprises a CPU or other type of processor, a memory, a network interface card (NIC) or other type of network interface, and a subset of the storage devices 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the host devices and the storage system 120 are possible.

The application tracing server 105 further comprises an instrumentation module 112, a flow type-based trace event identification and processing module 114 and a plurality of sampling window buffers 116. As discussed hereinafter, the instrumentation module 112 allows a software developer or other user to add instrumentation to source code to enable the tracing of trace events, as would be apparent to a person of ordinary skill in the art. The exemplary flow type-based trace event identification and processing module 114 identifies trace events in instrumented source code and processes the trace events using the disclosed application tracing techniques. The sampling window buffers 116 maintain cumulative counters of events for particular trace events and a cumulative time between adjacent trace events for a given time period and for a particular processing core. The term "adjacent trace event," as used herein, shall be broadly construed and shall not be limited to an immediately adjacent trace event.

It is to be appreciated that this particular arrangement of modules and other elements 112, 114 and 116 illustrated in the application tracing server 105 of the FIG. 1 embodiment is presented by way of example only, and alternative arrangements can be used in other embodiments. For example, the functionality associated with modules and elements 112 and 114 in other embodiments can be combined into a single module, or separated across a larger number of modules. As another example, multiple distinct processors and/or memory elements can be used to implement different ones of modules 112 and 114 or portions thereof. At least portions of modules 112 and 114 may be implemented at least in part in the form of software that is stored in memory and executed by a processor.

It is further noted that the functionality of application tracing server 105 or portions thereof may be implemented by one or more of the user devices 102 and/or the storage controller 124 in other embodiments, as would be apparent to a person of ordinary skill in the art.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Additionally, the application tracing server 105 can have an associated performance statistics database 106 configured to store performance data pertaining to monitored applications generated using the disclosed application tracing techniques.

The database 106 in the present embodiment is implemented using one or more storage systems 120 associated with the application tracing server 105. Such storage systems can comprise any of a variety of different types of storage including NAS, SANs, DAS and distributed DAS, as well as combinations of these and other storage types, including software-defined storage.

Also associated with the application tracing server 105 can be one or more input-output devices (not shown), which illustratively comprise keyboards, displays or other types of input-output devices in any combination. Such input-output devices can be used, for example, to support one or more user interfaces to the application tracing server 105, as well as to support communication between the application tracing server 105 and other related systems and devices not explicitly shown.

The application tracing server 105 in the FIG. 1 embodiment is assumed to be implemented using at least one processing device. Each such processing device generally comprises at least one processor and an associated memory, and implements one or more functional modules for controlling certain features of the application tracing server 105. More particularly, application tracing server 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface allows the user devices 102 and/or the application tracing server 105 to communicate over the network 104 with each other (as well as one or more other networked devices), and illustratively comprises one or more conventional transceivers.

It is to be understood that the particular set of elements shown in FIG. 1 for application tracing for inline performance analysis is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112 and 114 and buffers 116 of application tracing server 105 in computer network 100 will be described in more detail with reference, for example, to the flow diagram of FIG. 4.

Figure 2:
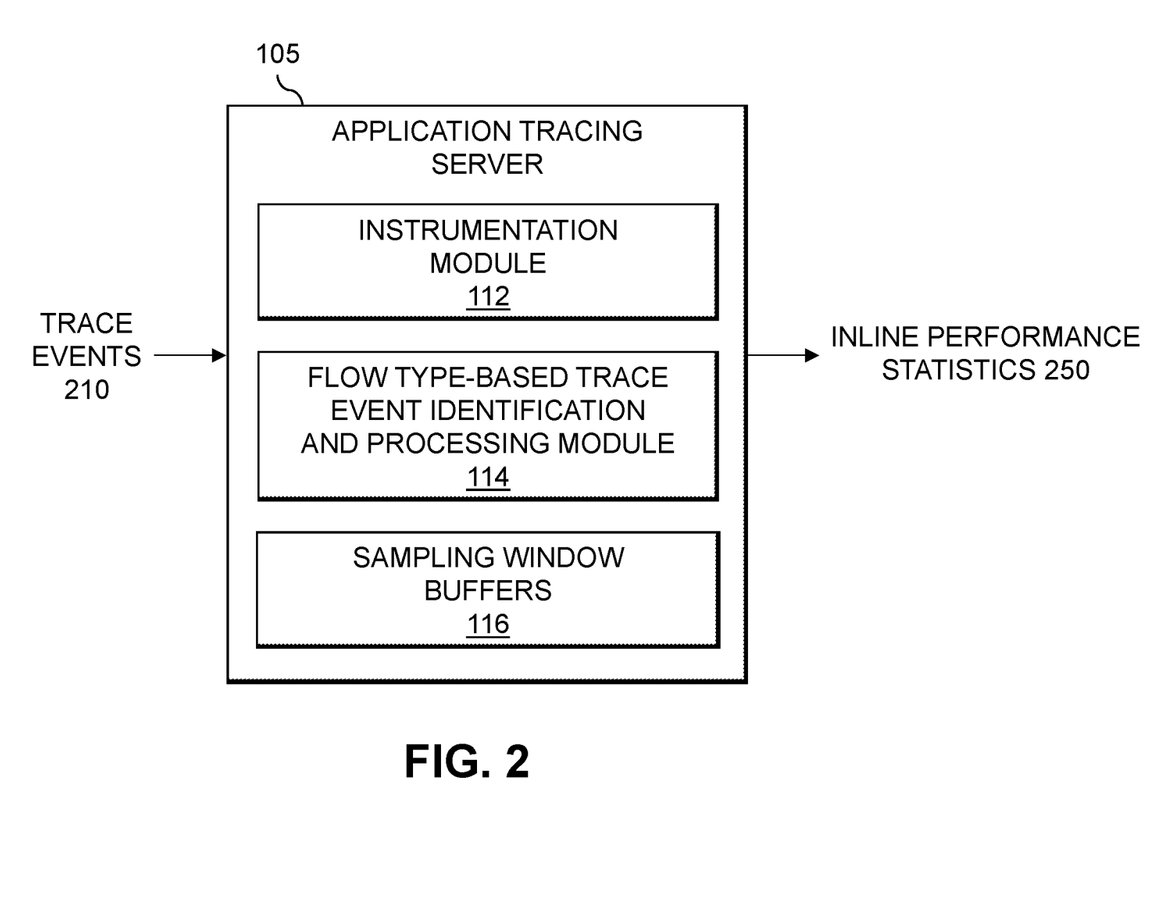
FIG. 2 illustrates the application tracing server of FIG. 1 in further detail, according to at least one embodiment.

FIG. 2 illustrates the application tracing server 105 of FIG. 1 in further detail, according to at least one embodiment. The instrumentation module 112, flow type-based trace event identification and processing module 114 and sampling window buffers 116 may be implemented in a similar manner as FIG. 1, as would be apparent to a person of ordinary skill in the art. As shown in FIG. 2, the application tracing server 105 processes trace events 210 generated, for example, by one or more instructions executed in response to trace points placed in instrumented source code. In a further variation, the trace points can alternatively (or additionally) be inserted in compiled execution code. The trace events 210 are typically encountered by the same execution instance of an application. The modules 112 and 114 and buffers 116 operate in a substantially similar manner as described above in conjunction with FIG. 1, and as discussed further herein.

As shown in FIG. 2, the exemplary application tracing server 105 generates inline performance statistics 250, such as an average time between a respective trace event and an adjacent trace event in the time window. The inline performance statistics 250 may be obtained, for example, for each flow type and code section.

Figure 3:
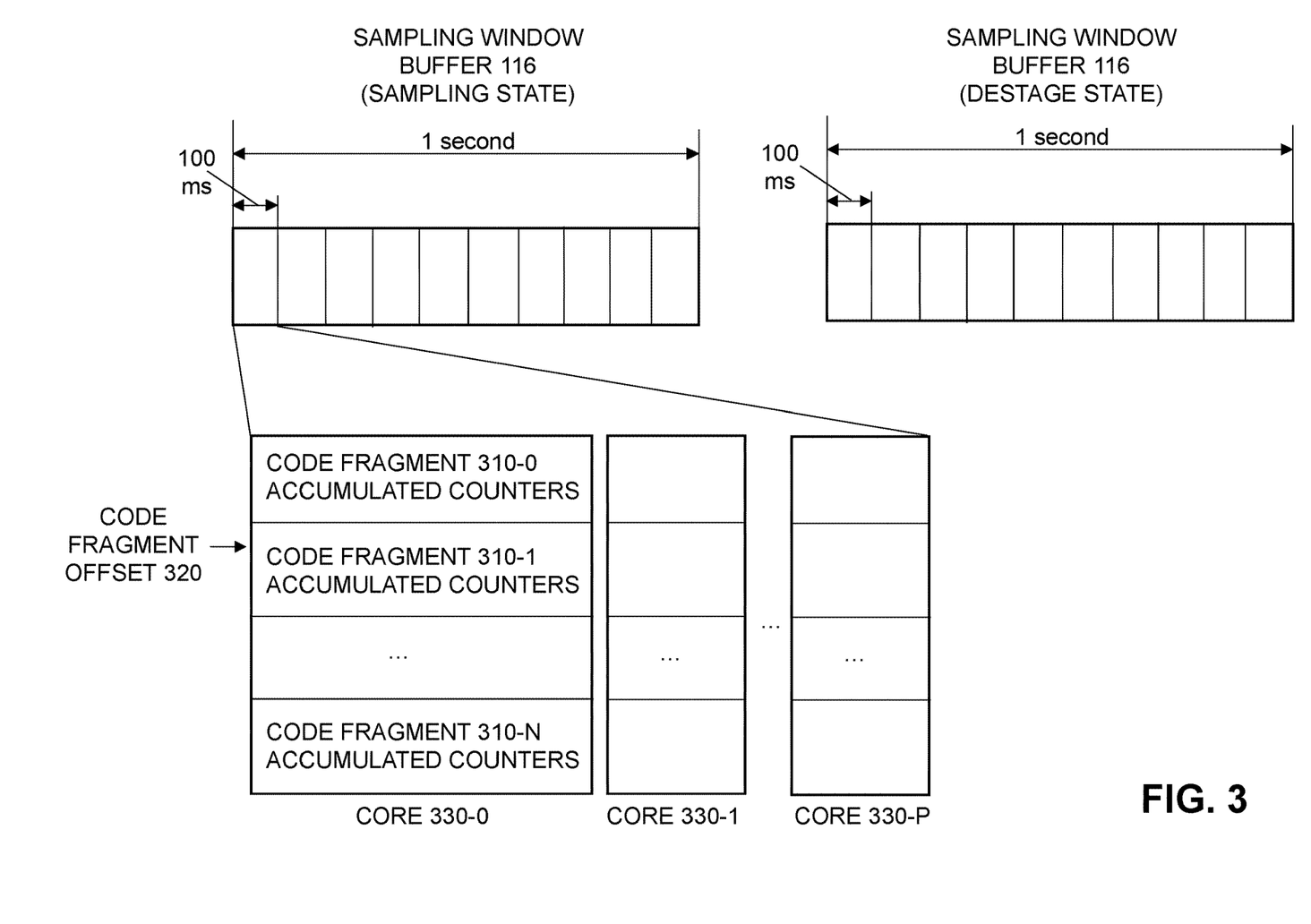
FIG. 3 illustrates an exemplary sampling window buffer of FIG. 1 in further detail, according one or more embodiments.

FIG. 3 illustrates an exemplary sampling window buffer 116 of FIG. 1 in further detail, according one or more embodiments. As shown in FIG. 3, in a sampling state, the exemplary sampling window buffer 116 is used to record data for trace events 210 for a one second time window. In the example of FIG. 3, the sampling window moves for each 100 millisecond (ms) within the one second time window, separately for each processing core 330-0 through 330-P, and supplies a reference clock. The reference clock is used to translate accumulated event counters (e.g., number of events and inter-event time) into event rates. In some embodiments, each processing core 330 writes into a separate buffer 116 to avoid a necessity of write synchronization and corresponding contention locks. As discussed hereinafter, the statistical counters are calculated over the small windows (e.g., 100 ms windows). Thus, current actual data is available even in a live system and in real time.

As shown in FIG. 3, the sampling window buffer 116 for each processing core comprises a number of entries, where each entry corresponds to a particular code fragment 310-0 through 310-N. Each code fragment 310 corresponds to a particular combination of: (a) flow type associated with the instructions that generated the respective trace event, (b) a trace event identifier for a first trace point (e.g., trace point A), and (c) an adjacent trace event identifier for a second trace point (e.g., trace point B). The various possible flow types associated with the instructions that generated the respective trace event are defined by a developer or another user during instrumentation of the software. For example, in one embodiment, the key, referred to as a code_fragment_offset (code fragment offset 320), for the buffer entry is computed, as follows:

code_fragment_offset=lockless_hash_lookup(flow_id,_trace_point_A,trace_point_B).

The timestamp of each trace event is used to update the accumulated values in each buffer entry. In particular, each buffer entry records (i) an accumulated number of passes for each pair of trace events indicating a number of the events, and (i) an accumulated time spent between the two trace events A and B. The sampling window buffer 116 accumulates these values for each 100 ms window, for each flow and for each code section (e.g., indicating an average per time window).

The accumulated time and accumulated number of passes allows an average time spent by an execution instance between the trace events. For example, the accumulated values in each buffer entry can be used to determine, for example, inter-event times, running average, mean value, maximum values and/or a running variance.

In a destage state, a destage thread is instantiated for each processing core 330 to destage a content of the sampling window buffer 116 for storage of the recorded data, for example, on a disk or other storage media.

In this manner, the sampling window buffers 116 collect and pre-process the performance data for each flow type, rather than for each execution instance. The data in the sampling window buffer 116 is collected for each pair of trace points that are passed one after the other by the execution instance. In a general case, these trace points are not begin and end points belonging to the same code fragment 310. The code fragments 310 may overlap or be included one in the other, as discussed further below in conjunction with FIG. 5.

In one or more embodiments of the sampling window buffer 116, the time is logged as the time elapsed from the previous trace event (e.g., inter-event time). The time (latency) measurements can include the running average, mean and maximum values. In one exemplary embodiment, the time variance can also be estimated using an inline algorithm, such as the algorithm described in Tony Finch, "Incremental Calculation of Weighted Mean and Variance," University of Cambridge Computing Service (February 2009), incorporated by reference herein in its entirety.

Figure 4:
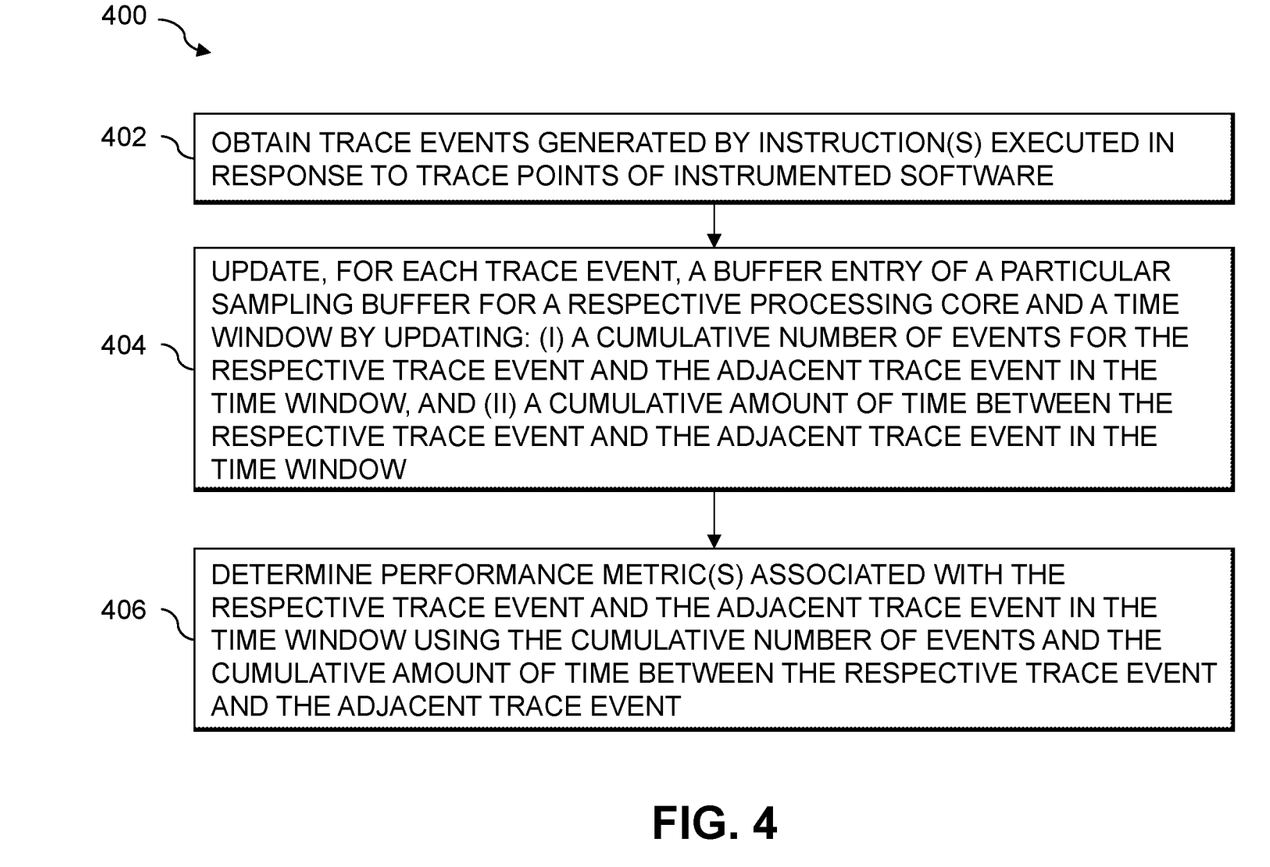
FIG. 4 is a flow chart illustrating an exemplary implementation of an application tracing process for inline performance analysis, according to one embodiment of the disclosure.

FIG. 4 is a flow chart illustrating an exemplary implementation of an application tracing process 400 for inline performance analysis, according to one embodiment of the disclosure. As shown in FIG. 4, the exemplary application tracing process 400 initially obtains trace events during step 402 generated by instruction(s) executed in response to trace points of instrumented software (e.g., source code and/or compiled execution code). In at least some embodiments of the disclosure, the trace points are encountered by the same execution instance of a given application.

During step 404, the application tracing process 400 updates, for each trace event, a buffer entry of a particular sampling buffer for a respective processing core and a time window by updating: (i) a cumulative number of events for a respective trace event and an adjacent trace event in the time window, and (ii) a cumulative amount of time between the respective trace event and the adjacent trace event in the time window. In at least some embodiments, the accumulation is performed for each flow type over one or more execution instances. The buffer entry of the particular sampling buffer is identified, for example, based on (a) a flow type identifier associated with the one or more instructions, (b) an identifier of the respective trace event, and (c) an identifier of an adjacent trace event corresponding to an adjacent trace point passed by a given execution instance to the respective trace event. In some embodiments, the buffer entry of the particular sampling buffer is identified by applying a hash operation to items (a) through (c). In another variation, the flow type identifier can be implied or assigned a default value, such as in the case of a single flow type, or when flow type-specific performance data is not required. In such cases, the collected data degrades to values averaged over all flow types.

One or more performance metrics associated with the respective trace event and the adjacent trace event in the time window are determined during step 406 using the cumulative number of events and the cumulative amount of time between the respective trace event and the adjacent trace event.

In some embodiments, the one or more performance metrics determined during step 406 comprise an average time between the respective trace event and the adjacent trace event in the time window (such as the 100 ms time window of FIG. 3) indicates an amount of time that it takes to process a given code section between two given trace points. The average time between the respective and adjacent trace events is also called "processing time" or "processing latency." The "processing time" may very as a function of time. The determined average time between the respective and adjacent trace events can be used, for example, to estimate a number of CPU (central processing unit) clock cycles for each Io-request, to detect system bottlenecks, and as an indication of activity of background processes.

In some embodiments, one or more statistics for a number of consecutive pairs of respective and adjacent trace events can be aggregated to obtain statistics for a desired number of consecutive event pairs.

In some embodiments, the application tracing process 400 can also determine (i) a variance of the time between the respective trace event and the adjacent trace event in the time window using the first counter and the second counter, and/or (ii) a minimum and/or a maximum of the time between the respective trace event and the adjacent trace event in the time window for a given flow type. In this manner, the disclosed techniques for application tracing for inline performance analysis provides a statistical flow breakdown characterizing, for example, an average, a deviation, a tail latency and minimum and maximum values in a substantially non-intrusive way.

The flow type identifier processed during step 404 is identified in the instrumented source code and identifies a flow type comprising, for example, a read synchronous flow, a write synchronous flow, a disk defragmentation flow, a disk rebuild flow, a synchronous execution flow and a background execution flow.

Figure 5:
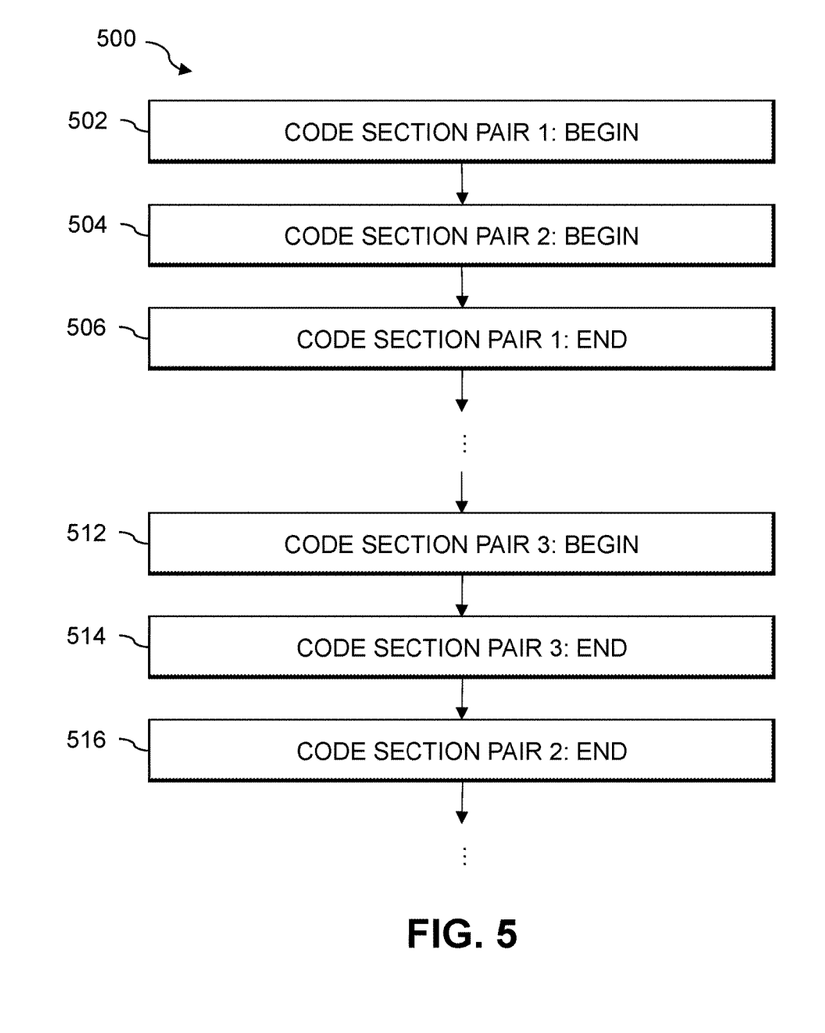
FIG. 5 illustrates an exemplary processing graph generated using the disclosed instrumentation and application tracing techniques, according to some embodiments of the disclosure.

FIG. 5 illustrates an exemplary processing graph 500 generated using the disclosed instrumentation and application tracing techniques, according to some embodiments of the disclosure. As shown in FIG. 5, the software associated with the processing graph 500 has been instrumented to mark each desired monitoring point of the software with begin statements 502, 504, 512 and end statements 506, 514, 516. While conventional application tracing techniques evaluate the code between each begin-end pair, the disclosed application tracing techniques monitor the code between each adjacent trace point, such as between 502 and 504 and between 512 and 514. As shown in FIG. 5, the code sections may not only include each other but also overlap partially.

The disclosed techniques for application tracing for inline performance analysis improves the ability to scale in terms of execution instances using inline statistical preprocessing. In the disclosed method, the size of the recording over a time interval is proportional to the number of flow types that appeared during a given time interval (and, e.g., not to a number of execution instances presented in the system during the time interval).

In this manner, the disclosed application tracing techniques allow longer recording times; inline monitoring (and future inline automatic system tuning, since the achieved scalability does not require complex time and resource consuming post-processing); and automated identification of the performance bottlenecks, when used in combination with the techniques described, for example, in United States Published Patent Application No. 2020/0133541, Ser. No. 16/176,351, filed Oct. 31, 2018, entitled "Method and Apparatus for Bottleneck Identification in High-Performance Storage Systems," now U.S. Pat. No. 10,747,453, incorporated by reference herein in its entirety.

In addition, the disclosed application tracing techniques can be implemented from scratch or by modification of already existing application tracing instrumentation. In the second case, the disclosed method does not replace the existing mechanism but adds an additional mode of "scalable recording" to the already existing instrumentation.

The particular processing operations and other network functionality described in conjunction with the flow diagram of FIG. 4 are presented by way of illustrative example only, and should not be construed as limiting the scope of the disclosure in any way. Alternative embodiments can use other types of processing operations for application tracing for inline performance analysis. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for application tracing for inline performance analysis. The foregoing applications and associated embodiments should be considered as illustrative only, and numerous other embodiments can be configured using the techniques disclosed herein, in a wide variety of different applications.

It should also be understood that the disclosed application tracing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for application tracing for inline performance analysis may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based application tracing engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based application tracing engine platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
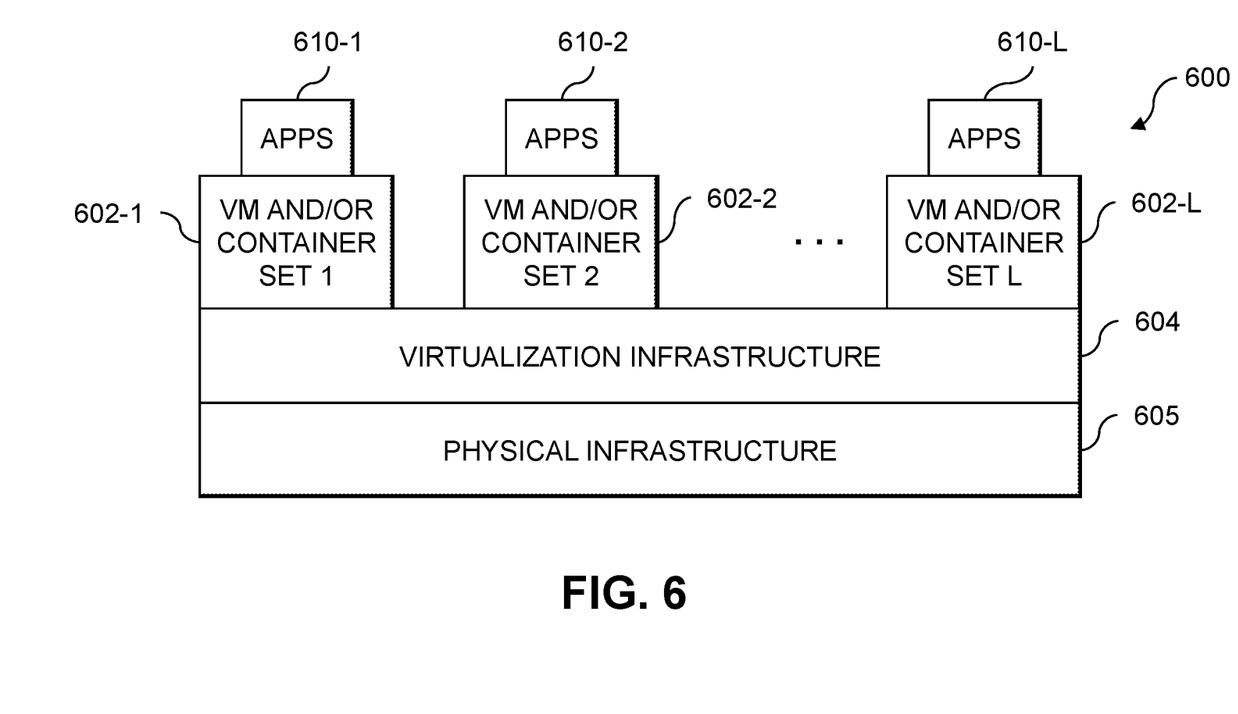
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide application tracing functionality of the type described above for one or more processes running on a given one of the VMs. For example, each of the VMs can implement application tracing control logic and associated statistical processing functionality for providing inline performance analysis for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide application tracing functionality of the type described above for one or more processes running on different ones of the containers. For example, a container host device supporting multiple containers of one or more container sets can implement one or more instances of application tracing control logic and associated statistical processing functionality for providing inline performance analysis.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
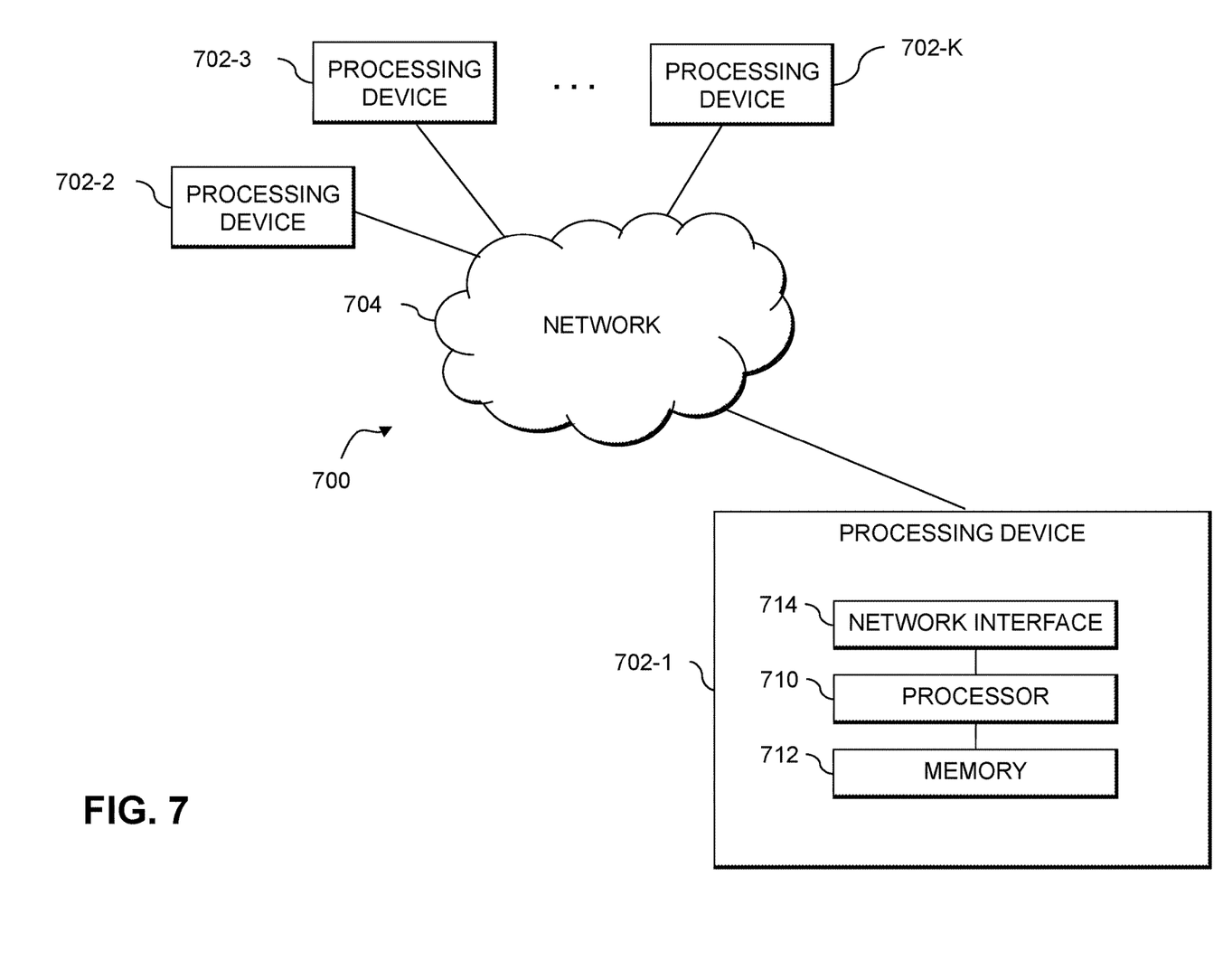
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of trace events generated by one or more instructions executed in response to trace points placed in instrumented software;
   updating, for each trace event, a buffer entry of a particular sampling buffer of a plurality of sampling buffers, wherein the particular sampling buffer corresponds to a particular processing core of a plurality of processing cores and a time window, wherein the particular processing core executes the one or more instructions that generated a respective trace event, wherein the buffer entry of the particular sampling buffer is identified based at least in part on (a) a flow type identifier associated with the one or more instructions, (b) an identifier of the respective trace event, and (c) an identifier of an adjacent trace event to the respective trace event, wherein the adjacent trace event corresponds to an adjacent trace point processed by a given execution instance, and wherein the updating comprises (i) updating a first counter indicating a cumulative number of events for the respective trace event and the adjacent trace event for the time window, and (ii) updating a second counter indicating a cumulative amount of time between the respective trace event and the adjacent trace event in the time window; and
   determining one or more performance metrics associated with the respective trace event and the adjacent trace event in the time window using the first counter and the second counter,
   wherein the method is performed by at least one processing device comprising a processor coupled to a memory.

2. The method of claim 1, further comprising determining one or more of an average and a variance of the time between the respective trace event and the adjacent trace event in the time window using the first counter and the second counter.

3. The method of claim 1, further comprising determining one or more of a minimum and a maximum of the amount of time between the respective trace event and the adjacent trace event in the time window for a given flow type.

4. The method of claim 1, further comprising destaging a content of the buffer entries of the plurality of sampling buffers using at least one destage thread.

5. The method of claim 1, wherein the flow type identifier is identified in the instrumented software.

6. The method of claim 5, wherein the flow type identifier identifies a flow type comprising one or more of a read synchronous flow, a write synchronous flow, a disk defragmentation flow, a disk rebuild flow, a synchronous execution flow and a background execution flow.

7. The method of claim 1, wherein the particular sampling buffer is identified by applying a hash operation to (a) the flow type identifier associated with the one or more instructions, (b) the identifier of the respective trace event, and (c) the identifier of the adjacent trace event to the respective trace event.

8. An apparatus comprising:
   at least one processing device comprising a processor coupled to a memory;
   the at least one processing device being configured to implement the following steps:
   obtaining a plurality of trace events generated by one or more instructions executed in response to trace points placed in instrumented software;
   updating, for each trace event, a buffer entry of a particular sampling buffer of a plurality of sampling buffers, wherein the particular sampling buffer corresponds to a particular processing core of a plurality of processing cores and a time window, wherein the particular processing core executes the one or more instructions that generated a respective trace event, wherein the buffer entry of the particular sampling buffer is identified based at least in part on (a) a flow type identifier associated with the one or more instructions, (b) an identifier of the respective trace event, and (c) an identifier of an adjacent trace event to the respective trace event, wherein the adjacent trace event corresponds to an adjacent trace point processed by a given execution instance, and wherein the updating comprises (i) updating a first counter indicating a cumulative number of events for the respective trace event and the adjacent trace event for the time window, and (ii) updating a second counter indicating a cumulative amount of time between the respective trace event and the adjacent trace event in the time window; and determining one or more performance metrics associated with the respective trace event and the adjacent trace event in the time window using the first counter and the second counter.

9. The apparatus of claim 8, further comprising determining one or more of an average and a variance of the time between the respective trace event and the adjacent trace event in the time window using the first counter and the second counter.

10. The apparatus of claim 8, further comprising determining one or more of a minimum and a maximum of the amount of time between the respective trace event and the adjacent trace event in the time window for a given flow type.

11. The apparatus of claim 8, further comprising destaging a content of the buffer entries of the plurality of sampling buffers using at least one destage thread.

12. The apparatus of claim 8, wherein the flow type identifier is identified in the instrumented software.

13. The apparatus of claim 12, wherein the flow type identifier identifies a flow type comprising one or more of a read synchronous flow, a write synchronous flow, a disk defragmentation flow, a disk rebuild flow, a synchronous execution flow and a background execution flow.

14. The apparatus of claim 8, wherein the particular sampling buffer is identified by applying a hash operation to (a) the flow type identifier associated with the one or more instructions, (b) the identifier of the respective trace event, and (c) the identifier of the adjacent trace event to the respective trace event.

15. A non-transitory processor-readable storage medium having stored therein program code of one or more software programs, wherein the program code when executed by at least one processing device causes the at least one processing device to perform the following steps:

obtaining a plurality of trace events generated by one or more instructions executed in response to trace points placed in instrumented software;

updating, for each trace event, a buffer entry of a particular sampling buffer of a plurality of sampling buffers, wherein the particular sampling buffer corresponds to a particular processing core of a plurality of processing cores and a time window, wherein the particular processing core executes the one or more instructions that generated a respective trace event, wherein the buffer entry of the particular sampling buffer is identified based at least in part on (a) a flow type identifier associated with the one or more instructions, (b) an identifier of the respective trace event, and (c) an identifier of an adjacent trace event to the respective trace event, wherein the adjacent trace event corresponds to an adjacent trace point processed by a given execution instance, and wherein the updating comprises (i) updating a first counter indicating a cumulative number of events for the respective trace event and the adjacent trace event for the time window, and (ii) updating a second counter indicating a cumulative amount of time between the respective trace event and the adjacent trace event in the time window; and determining one or more performance metrics associated with the respective trace event and the adjacent trace event in the time window using the first counter and the second counter.

16. The non-transitory processor-readable storage medium of claim 15, further comprising determining one or more of an average and a variance of the time between the respective trace event and the adjacent trace event in the time window using the first counter and the second counter.

17. The non-transitory processor-readable storage medium of claim 15, further comprising determining one or more of a minimum and a maximum of the amount of time between the respective trace event and the adjacent trace event in the time window for a given flow type.

18. The non-transitory processor-readable storage medium of claim 15, further comprising destaging a content of the buffer entries of the plurality of sampling buffers using at least one destage thread.

19. The non-transitory processor-readable storage medium of claim 15, wherein the flow type identifier is identified in the instrumented software and identifies a flow type comprising one or more of a read synchronous flow, a write synchronous flow, a disk defragmentation flow, a disk rebuild flow, a synchronous execution flow and a background execution flow.

20. The non-transitory processor-readable storage medium of claim 15, wherein the particular sampling buffer is identified by applying a hash operation to (a) the flow type identifier associated with the one or more instructions, (b) the identifier of the respective trace event, and (c) the identifier of the adjacent trace event to the respective trace event.

\* \* \* \* \*